Sept. 8, 1964  R. L. WOERHEIDE  3,147,981
KIT CONTAINING AN AUXILIARY SEAL FOR FLUID MOTORS
Filed April 9, 1962  2 Sheets-Sheet 1

INVENTOR.
RAYMOND L. WOERHEIDE
BY
*Sutherland Polster + Taylor*
ATTORNEYS

Sept. 8, 1964                R. L. WOERHEIDE                3,147,981
                KIT CONTAINING AN AUXILIARY SEAL FOR FLUID MOTORS
Filed April 9, 1962                                     2 Sheets-Sheet 2

INVENTOR.
RAYMOND L. WOERHEIDE
BY
Sutherland Polster & Taylor
ATTORNEYS

United States Patent Office 3,147,981
Patented Sept. 8, 1964

3,147,981
KIT CONTAINING AN AUXILIARY SEAL FOR
FLUID MOTORS
Raymond Lee Woerheide, Bridgeton, Mo., assignor to
Champ-Items, Inc., St. Louis, Mo., a corporation of
Missouri
Filed Apr. 9, 1962, Ser. No. 186,047
11 Claims. (Cl. 277—9)

This invention relates to a kit to seal leaks which occur between a shaft and a shaft seal in an hydraulic motor. More specifically the invention is a kit including an auxiliary seal which permits the installation of an auxiliary seal to an hydraulic motor thereby eliminating leakage of hydraulic fluid between the motor shaft and the original seal which has become ineffective.

One of the better known applications for such hydraulic motors is found in power steering systems on motor vehicles. Many of such systems require an hydraulic servo-motor for direct power application to the steering linkage of the vehicle. The most common form of servo-motor used is a double acting piston and cylinder type with power connections to supply fluid under pressure to opposite sides of a piston. This invention will be described as applied to servo-motors for such a use.

In power steering systems, the servo-motor is usually located between the chassis and the linkage connected directly with the front wheel spindles in the motor vehicle. The chassis mounted end of the servo-motor is usually an eye at the closed end of the power cylinder which is attached to the steering linkage of the vehicle by a bolt passing through the eye. A bushing of rubber-like material between the bolt and the eye provides for swinging movement of the cylinder on the bolt and for some rocking between the cylinder and the bolt. A shaft, or piston rod, projects through a seal at one end of the power cylinder and is attached to a bracket on the chassis. Power connections to the cylinder are made by flexible hose so as to accommodate movement of the cylinder as it follows the path of travel of the end of the shaft secured to the dirigible steering linkage. Even small motors of this kind are capable of a stroke of about seven inches. It will be apparent that the environment in which these motors operate is extremely unfavorable, since the servo-motor is exposed to the splash and dust from the wheels of the vehicle and to road shocks which tend to distort the piston rod. It will be appreciated that under even normal use the piston rod surface may be damaged by flying stones, although it is plated to provide a had non-corrosive finish. Even if these contingencies do not occur, still it is possible for a gritty coating to form on the piston rod, or shaft, which will adhere strongly to even a polished surface, such as this. Under such adverse conditions, it is almost impossible for a piston rod seal to remain effective against substantial leakage for any extended amount of car mileage. When leakage once occurs, it then becomes progressively worse even to the point of danger, and the cost of replacing the hydraulic fluid becomes excessive. Overhaul of the servo-motor is also expensive, but is rendered unnecessary by installation of a kit, according to this invention.

It is an object of this invention to provide a kit with an auxiliary seal to stop the leakage of hydraulic fluid around the shaft and through the seal of a servo-motor.

It is another object of this invention to provide a kit with an auxiliary seal for fluid powered servo-motors adapted to stop fluid leaks past the original seal between a piston rod and a cylinder.

It is another object of this invention to provide a kit with an auxiliary seal for installation on a servo-motor which will avoid the cost of removal and replacement of an original seal in the motor.

It is still another object of this invention to provide a kit with an auxiliary seal for the purpose stated in these objects which is inherently self-centered on the rod, or shaft, of the servo-motor and is adapted to make the initial seal flexible to accommodate rod movement in the cylinder.

The kit, according to this invention, is intended to be installed to provide a seal preventing leakage of hydraulic fluid between the piston rod, or shaft, and the rod bearing in the cylinder of a fluid motor without replacing the original seal at this location. In this respect, this invention differs from known prior kits of this kind which require removal of the original seal. It is impractical to replace an original seal without removing the entire fluid flow and disconnecting its pressure lines. This requires labor and is a waste of time. To apply prior kits also requires removal of the original seal, so far as I am aware, and this operation requires removal of the seal retaining ring and actuation of the steering control with the pump running to supply the required hydraulic pressure to blow out the original seal. When the job is completed, the wasted fluid must be replaced at an additional cost.

The kit, according to this invention, has an adapter which comes in various forms to fit different kinds of cylinder ends on the motors supplied by different car manufacturers. This adapter takes the form of a housing to protect the sealing parts in the kit after installation. These sealing parts are applied in series arrangement with the original seal in the motor. Consequently, advantage is taken of the remaining effectiveness of the original seal, which, depending on that effectiveness, will reduce the fluid pressure acting against the auxiliary seal when applied by installing this kit. The adapter in the kit not only protects the seal within its metal housing, but also provides for compressing the parts of the seal into fluid tight relation, one with the other, and with a part of the cylinder and shaft surface. This action, however, avoids the disadvantage of restricting relative movement between parts of the seal, or between parts of the seal and the piston rod, or cylinder, thereby avoiding any binding action restricting smooth operation of the motor which is bound to affect the feel in the steering if it occurs. The parts of the seal may float one with respect to the other and thus prevent eccentric wear which certainly contributes to early failure in a seal. These are some of the advantages in the broader aspect of the invention which readily distinguish it from prior proposals along this line.

Other objects and advantages of this invention will appear in the following detailed description which is in such clear, concise and exact terms as will enable any one skilled in the art to make and use the same when taken with the accompanying drawings, forming a part thereof, and in which.

There are described in detail hereinafter three embodiments of the invention which are kits modified to fit three different types of motors used in different models of motor vehicles of different makes. The principle difference between embodiments is the so-called adapter included in the kit. Basically each kit performs its sealing function in the same way by two distinct types of seal so arranged as to prevent binding between the shaft and any of the seals. This could result in unnecessary wear and unsatisfactory performance in a relatively short time, based upon, let us say, vehicle mileage as a base of comparison. It must be remembered that the kits are not primarily intended as original equipment to be installed by the manufacturer of the motor. The motors to which the kits will be applied will be generally those which have been in use for many vehicle miles, and, consequently, the condition of the parts of the motor are expected to be not in the best of shape. Piston rods may not be perfectly true, or straight, or round. This will quite often be the case, and it is often true that surface damage is present along the shaft. In many cases, one or more of these defects will cause replacement of the original seal installed as original equipment to be wholly impractical. Thus, it has occurred to many part manufacturers that the only seal which could salvage the motor for further use would be the old-fashioned type of stuffing box. These, however, are notorious for producing a binding action in one portion, or another, along the rod which, of course, is readily noticeable in the feel of the steering. This is a disadvanage to be avoided and only a seal with relatively floating parts will eliminate binding where the shaft is worn, or is not true in other respects.

In each of the embodiments of this invention, the seal has floating parts. One part is supported primarily by the shaft, another part is supported primarily by the cylinder, and a seal between the parts accommodates movement therebetween while preventing any leakage.

Another feature of the seal are parts which shear away dirt, tar, etc., before the shaft passes the seal, and it is likewise true of these shaft cleaner parts that some restrained floating action is possible to avoid the fault of binding and unnecessary wear.

Figure 1:
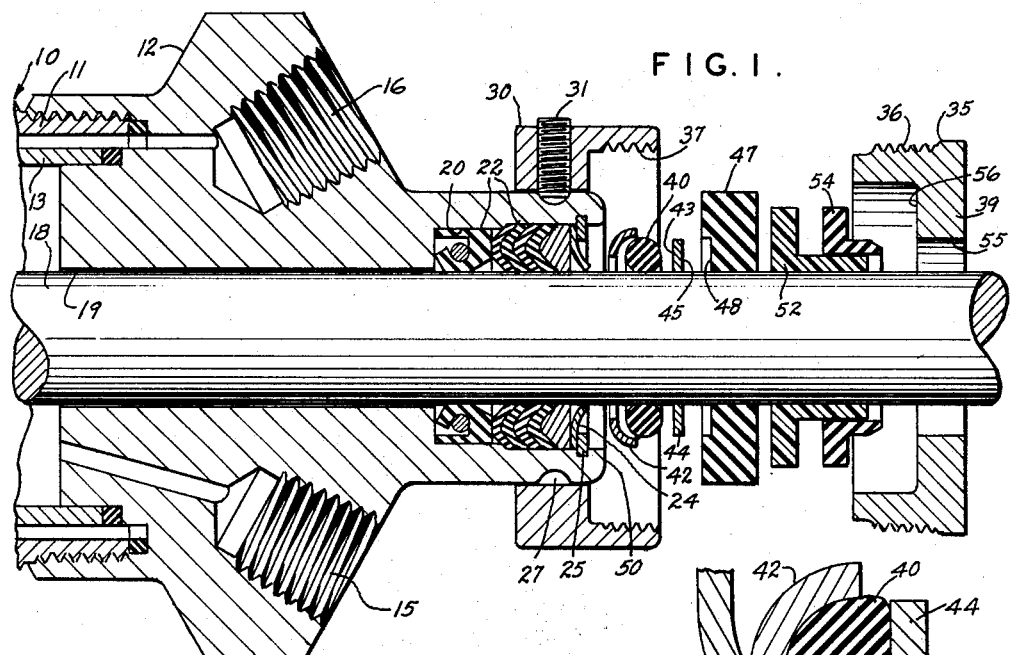
FIG. 1 is a side elevational view partly in section on a greatly enlarged scale illustrating a conventional piston rod cylinder and original seal with the parts of the kit applied thereto but shown separated for a clearer understanding of the operation.
Figure 2:
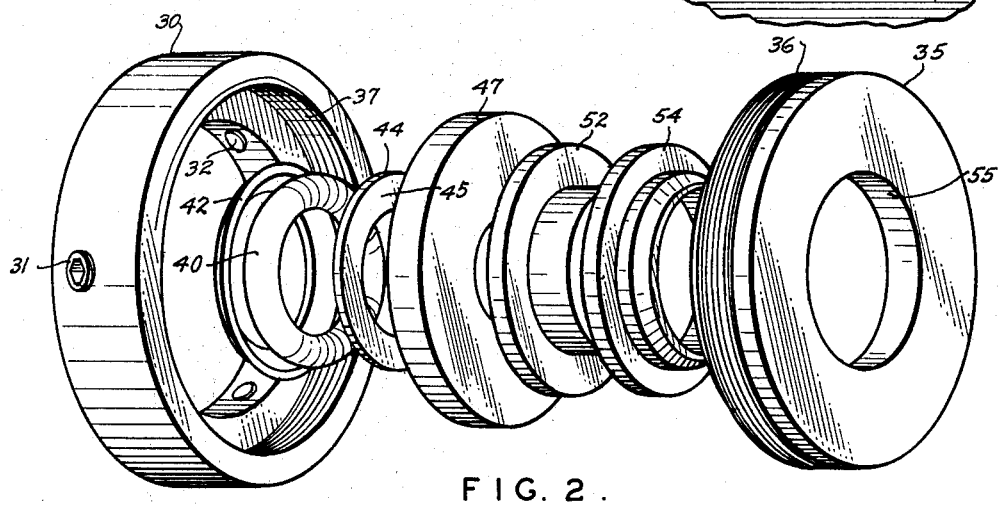
FIG. 2 is an exploded view in perspective showing the separate parts in a kit.

In order to obtain a clear understanding of the floating type of seal and its parts, reference is made to FIG. 1 in which the parts have been separated and to FIG. 2 in which details of the parts are shown in an exploded view. The power cylinder 10 for the hydraulic motor has an outer barrel 11 threaded into the head 12, and this in turn clamps the inner barrel 13 between the head 12 at one end and the end closure at the opposite end, not shown. The end closure at the opposite end is secured in the same way, however. The piston of the power motor travels within the inner barrel 13 and power to the head end of the power cylinder is supplied through the combined inlet and exhaust passage 15. Power to the opposite end of the cylinder 13 is supplied through the combined intake and exhaust connections 16 which connects with the space between the barrels 11 and 13. It will be understood that the barrel 13 has a port at its opposite end communicating through the wall of the barrel 13.

Within the barrel 13 is the usual piston connected to drive the shaft, or piston rod, 18. When pressure is connected with the combined inlet and exhaust connection 15, the piston will be forced to the left moving the shaft 18 in the same direction. When the shaft and piston move to the left, hydraulic fluid is exhausted through the connection 16 back to the power system. When it is desired to move the piston and rod 18 to the right, the power connections and exhaust connections are reversed, that is, hydraulic fluid under pressure is supplied to connection 16, while fluid is exhausted through the connection 15.

The head 12 through which the shaft 18 passes has an aperture 19 slightly larger than the diameter of the shaft 18 so as to allow for limited movement of the shaft 18 within the head 12. A cavity 20 is provided in the head 12 and this contains a plurality of sealing elements, such as collectively indicated as 22. The construction of these sealing elements within the cavity 20 is of no particular bearing on this invention. Suffice to say that these elements 22 comprise the original seal provided to prevent leakage between the outside of the shaft 18 through the aperture 19. These sealing elements are usually held in place by a metallic ring, such as 24, and in assembled position behind the metallic ring by a spring snap ring 25 seated in a circular groove on the inner wall of the cavity 20. The outside wall of the cavity has a peripheral groove, such as 27, the purpose of which is to receive a clamp ring holding a protective boot which surrounds the shaft 18.

So far the description has been limited to so much of the construction of a power cylinder for a servomotor and its seal as is necessary for an understanding of the manner of installing a kit according to this invention.

The kit, according to this invention, includes an adapter 30. This is in the form of a ring which slides over the outer wall of the cavity 20. It is held in place by a plurality of set screws, such as 31 and 32, threaded through radial holes in the ring 30 and engaging at their inner ends within the groove 27. The set screws 31, 32, etc., anchor the adapter part 30 in position on the cylinder 10. The adapter also includes a retaining ring 35 threaded at 36 to engage with threads 37 on the part 30.

It will be understood that the parts of the adapter 30 and 35 are shown separated so as to facilitate an understanding of the construction of the kit shown in FIG. 1. On the retaining ring is an inwardly projecting flange, or the like, 39, the function of which will be explained hereinafter.

Figure 6:
FIG. 6 is a fragmentary sectional view on an enlarged scale of parts shown in FIG. 1.

Shaft 18 carries an O-ring 40 of compressible rubber-like material which is dimensioned to have an initial snug engagement with the periphery of the shaft 18 and form a peripheral type of seal preventing leakage along the shaft 18. Behind the O-ring 40 is a metallic cup-shaped ring 42 which receives and forms a seat for the rubber-like O-ring 40 holding it from expansion along the face of plate 24 and away from shaft 18. Accordingly, the O-ring 40, under ordinary circumstances, engages only with the inner exposed edge of the ring 24, as shown in FIG. 6. In fact, O-ring 40 is carried primarily by the shaft 18 while cup-shaped ring 42 is carried solely by the O-ring 40. Cup-shaped ring 42 holds other portions of the O-ring 40 slightly spaced from the ring 24, and, since the cup-shaped ring 42 is of metal, it is capable of sliding movement on the metal face of the ring 24 if there is movement in the shaft 18 which requires the peripheral seal comprising O-ring 40 and cup-shaped ring 42 to move relative to the ring 24. Thus, the peripheral seal 40 and its cup-shaped ring holder 42 form a floating part of the seal movable with respect to other parts thereof.

Surrounding the shaft 18 is a metal seat 44. Preferably, the face 43 of the seat is flat. Face 43 also abuts against the side of the O-ring 40 opposite the cup-shaped ring 42. Contact between these parts forms what is termed the inner seal to prevent any leakage around the cup-shaped ring 42 from flowing inwardly to the surface of the shaft 18. Outwardly of the seat 44 is an annular ring 47 of rubber-like compressible material which has a seat, such as 48, formed in the radial face thereof to receive the metal seat 44. The annular ring 47 has an outer diameter corresponding with the outer diameter of the outer wall of the cavity 20 so that its inside peripheral edge will engage surface 50 on the motor 10, to form what is termed an outer seal. From the description of the parts in the kit so far, three separate seals have been described, O-ring 40 forms a peripheral seal. Seat 44 engaging the outer face of the O-ring 40 forms an inner seal against the radial face 43 of the seat over which the ring 40 is free to move in a floating manner to find its own center and accommodate motion of the shaft 18. Contact between the radial face 43 of the seat 44 and the O-ring 40 forms an inner radial seal preventing leakage around the O-ring. Contact between the outer periphery of the annular ring 47 and the wall 50 provides an outer radial seal preventing leakage outwardly along the wall of the cylinder 10. Ring 47 also seals against the rear face 45 of seat 44 preventing any leakage inwardly toward the shaft 18 in front of the metal seat 44.

No seal would be complete without some means for clearing foreign substances and dirt from the exterior of the shaft 18. To accomplish this purpose, there is provided in the seal a flanged bushing 52, preferably of nylon. This is surrounded by a flanged bushing 54 of compressible rubber-like material. The latter flanged bushing 54 is complementary in shape on its outside surface with the bore 55 of retaining ring 35 and is complementary in shape to the inner wall 56 of the retaining ring 35. Flanged nylon cleaner ring 52 is preferably made of cast nylon, or the like, which is relatively hard and indestructible. It has a close fit with the exterior surface of the shaft 18 and acts as a cleaner to remove foreign substances as the shaft 18 moves past the outer edge of the flanged bushing 52. At the same time, the flanged bushing 52 is capable of some floating action due to its cushion support on the compressible flanged bushing 54 so that some floating action is possible in instances where the shaft 18 is not true.

In installing the kit, retaining ring 35 is moved along the shaft to engage the threads 36 with the threads 37 and is made up a little more than hand tight which is sufficient to effect the compression of outer sealing ring 47 against wall 50, and against seal 44. The pressure exerted by the retaining ring 35 on outer sealing ring 47 forces the radial face 43 of seat 44 against the O-ring 40 forming the floating peripheral seal on the shaft 18. This moves the O-ring against the cup-shaped ring 42 which in turn abuts against the ring 24 of the original seal so as to squeeze the O-ring and cause it to be compressed. It is, of course, compressed against the radial face 43 and also compressed inwardly against the periphery of the shaft 18 because the cup-shaped ring 42 restrains outward compression of the material in the O-ring 40. Incidentally, there is a further seal at the edge of ring 24, as shown in FIG. 6.

Figure 3:
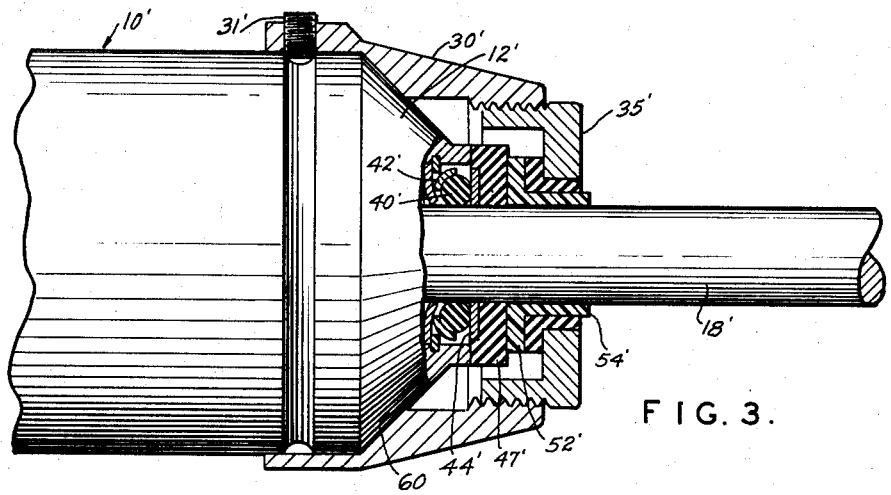
FIG. 3 is a side elevation partly in section showing the parts of a kit modified in form to fit another model of hydraulic cylinder.

FIG. 3 shows another embodiment of the invention in which the parts of the seal and the cleaner are exactly the same in their shape and action. The difference between the construction already described in FIG. 1 resides only in the adapter. In FIG. 3, the adapter is a conical housing 30' and it is secured to the exterior of the head 12' of the cylinder 10' by a plurality of set screws, such as 31'. Adapter 30' is threaded to receive the retaining ring part of the adapter 35' in exactly the same manner as above described. In this respect, it does not differ internally from the prior modification. It does differ internally in that it is provided with an annular tapered shoulder 60 specifically intended to seat upon the outer contour of the head 12'.

Figure 4:
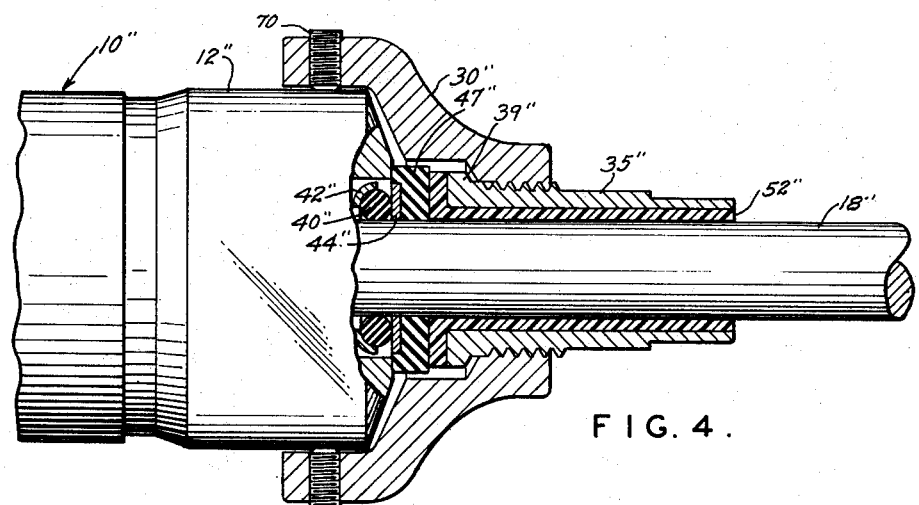
FIG. 4 is a side elevation partly in section of the parts in a kit of modified form to fit still another model of cylinder.
Figure 5:
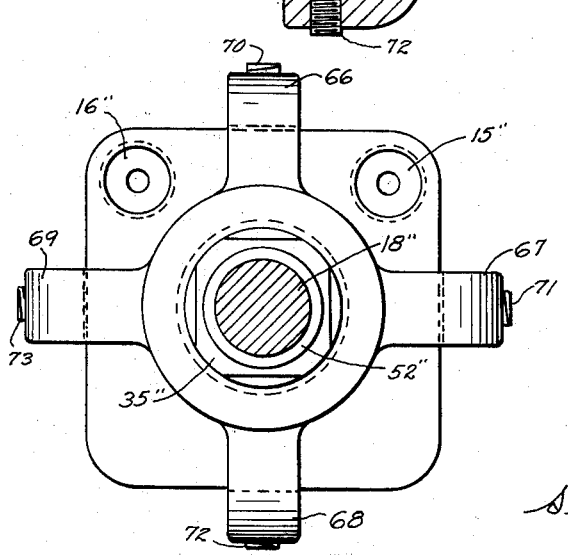
FIG. 5 is an end view of FIG. 4.

Turning now to FIGS. 4 and 5, these views show still another form of adapter for use on a model of cylinder in which the inlet and exhaust connections 15" and 16" are in the forward face of the head 12". The adapter 30" is accordingly provided with a plurality of spaced legs 66, 67, 68 and 69. These legs extend from the housing part of the adapter 30" and each is provided with a tapped hole to receive set screws, such as 70, 71, 72 and 73 illustrated in FIG. 4, which may be tightened into engagement with the head 12" holding the adapter 30" in place. This modification also differs in that the flange 39" on the retaining ring 35" is internal of the housing formed by the adapter 30". By putting the flange inside the housing, the adapter 30" can be made much smaller in diameter so as to provide necessary clearance for making the connections at 15" and 16". In this modification, the retaining ring 35" protrudes outwardly of the housing of the adapter to provide for adjustment of the pressure on the seal elements within the housing. This projecting part of the retaining ring 35" at least encloses the nylon bushing 52", which in this modification projects outwardly of the housing provided by the adapter and along the shaft 18". These features do not change the operation of the embodiment shown in FIGS. 4 and 5 from those previously described.

It is believed that the above description is sufficiently detailed to explain both the construction and operation of the invention.

Changes in and modifications of the construction described may be made without departing from the spirit of my invention or sacrificing its advantages.

Having thus described the invention, what is claimed and desired to be secured by Letters Patent is:

1. In a fluid seal for a shaft projecting through an aperture in the outer wall of a fluid motor, the combination comprising,
   (1) a peripheral type of seal movable bodily with respect to the wall of the fluid motor including an annular sealing ring around and engaging the periphery of said shaft and adapted when compressed to prevent leakage of fluid along the surface of the shaft,
   (2) a radial type of seal substantially fixed bodily with respect to the wall of the fluid motor including an annular seat around said shaft adapted to be pressed in sealing relation against a side of said peripheral seal to prevent leakage radially inwardly of said peripheral type seal and an annular ring of compressible material around said shaft with its inner periphery on said seat and its radial face at the outer periphery on a portion of said wall around said shaft to prevent leakage of fluid outwardly along said wall, and
   (3) means holding said peripheral type seal and said radial type seal compressed axially of said shaft to effectively prevent leakage from said aperture.

2. In a fluid seal for a shaft projecting through an aperture in the outer wall of a fluid motor, the combination comprising,
   (1) a peripheral type of seal movable bodily with respect to the wall including an annular sealing ring around and engaging the periphery of said shaft,
   (2) an annular cup-shaped ring around and engaging the outer periphery of said sealing ring adapted to cause said sealing ring to expand radially inwardly against the surface of said shaft when compressed,
   (3) a radial type of seal substantially fixed bodily with respect to the wall including an annular seat around said shaft adapted to be pressed in seating relation on a side of said peripheral seal to prevent leakage radially inwardly of said peripheral type seal and an annular ring of compressible material around said shaft with its inner periphery on said seat and its radial face at the outer periphery on a portion of said wall around said shaft to prevent leakage of fluid outwardly along said wall, and (4) means holding said peripheral type seal and said radial type seal compressed axially.

3. In a fluid seal for a shaft projecting through an aperture in the outer wall of a fluid motor, the combination comprising,
   (1) a peripheral seal movable bodily with respect to the wall including an annular sealing ring around and engaging the periphery of said shaft and a retainer means on said ring against which said ring is compressed in a direction axially of said shaft to prevent leakage of fluid along said shaft between said shaft and ring,
   (2) a radial type of seal including an annular metal ring with a flat radial face engaging the side of said sealing ring of said peripheral type seal and free to move with respect thereto in a direction transverse to said shaft,
   (3) an annular ring of compressible material around said shaft substantially fixed bodily with respect to the wall with its inner peripheral portion at one side against the side of said annular metal seat opposite said peripheral seal and its outer periphery at one side against a portion of said wall around said shaft to prevent leakage of fluid along said wall, and
   (4) means holding said peripheral type seal compressed against said shaft, said annular metal seat pressed against said peripheral seal and said annular ring of compressible material pressed against said seat and said wall.

4. A kit adapted to be applied to an hydraulic motor cylinder to stop leakage of hydraulic fluid past the original seal therein between the cylinder and piston rod, comprising in combination,
   (1) an adapter secured on the end of the cylinder around the rod,
   (2) a peripheral type of seal movable bodily with respect to the cylinder including an annular sealing ring around and supported by the rod and a retainer means around said ring against which said ring is compressed in a direction axially of said shaft to prevent leakage along said rod between said rod and said ring,
   (3) a radial type of sealing ring held against movement with respect to the motor including a seat part with one side face held against a side of said ring on which said peripheral seal can move and an annular ring part of compressible material held in sealing relation with the other side face of said seat part and said cylinder, and
   (4) means forming a part of said adapter and movable along said rod for compressing the compressible material in said seals.

5. A kit adapted to be applied to an hydraulic motor cylinder to stop leakage of hydraulic fluid past the original seal between the cylinder and piston rod, comprising in combination,
   (1) an adapter fixed on the end of the cylinder around the rod,
   (2) a peripheral type of seal movable bodily with respect to the cylinder including an annular sealing ring around and supported by the rod and a retainer around said ring supported by said original seal and against which said ring is compressed in a direction axially of said shaft to prevent leakage along said rod between said rod and said ring,
   (3) a radial type of seal held against movement with respect to the motor cylinder including an annular metal seat with one side face engaging the sealing ring of said peripheral seal,
   (4) an annular ring of compressible material around said rod with its inner peripheral portion held against the side of said annular metal seat opposite said peripheral seal and its outer side portion in sealing relation with the cylinder part of said hydraulic motor, and
   (5) means forming a part of said adapter and movable along said rod for compensating the compressible material in said seals.

6. A kit adapted to be applied to an hydraulic motor cylinder to stop leakage of hydraulic fluid past the original seal between the cylinder and piston rod, comprising in combination,
   (1) an adapter held fixed on the end of the cylinder around the rod,
   (2) a peripheral type of seal movable bodily with respect to the cylinder including an annular sealing ring of compressible material and an annular cup-shaped retainer for said sealing ring around and supported by the rod against said original seal and adapted when compressed to cause said sealing ring to expand against the periphery of said rod,
   (3) a radial type of seal held against movement with respect to the motor cylinder including an annular metal ring disposed with one side engaged with a side of the sealing ring of said peripheral seal,
   (4) an annular ring of compressible material around said rod with its inner peripheral side portion on the side of said annular metal seat opposite said peripheral seal and its outer peripheral side portion in sealing relation with said motor cylinder, and
   (5) means forming a part of said adapter and movable along said rod for holding said sealing means compressed around said rod, against said annular metal seat, and against said motor cylinder respectively.

7. A kit adapted to be applied to an hydraulic motor cylinder to stop leakage of hydraulic fluid past the original seal between the cylinder and piston rod, comprising in combination,
   (1) an adapter held fixed on the end of the cylinder around the rod,
   (2) a plurality of interengaging ring-shaped elements supported in series relation along said rod adjacent said original seal including at least one sealing ring element supported directly only from said rod, a metal retainer ring positioned by said original seal against which said sealing ring is compressed to stop leakage between said ring and said rod, and at least one sealing ring element surrounding said rod and supported directly only from said cylinder and compressed against both said sealing ring element supported by said rod and said cylinder to compress said sealing ring element supported by said rod against said retainer ring, and
   (3) means forming a part of said adapter and movable along said rod for holding said sealing elements compressed.

8. The combination as defined in claim in which;
   (1) said means forming a part of said adapter supports a cleaner ring around said rod in assembled relation with said ring-shaped elements.

9. A kit adapted to be applied to an hydraulic motor cylinder to stop leakage of hydraulic fluid past the original seal between the cylinder and shaft, comprising in combination,
   (1) an adapter held fixed on the end of the cylinder and forming a housing,
   (2) a seal in said housing including a plurality of relatively floating ring-shaped elements in series relation around said shaft adjacent the said original seal,
      (2a) one of said elements being supported directly by said shaft and forming a peripheral seal on the surface of said shaft,
      (2b) another of said elements being supported directly by the cylinder and forming a seal with said cylinder and a radial type of seal with said one element which accommodates movement of said shaft and said one element supported thereon in a radial direction with respect to said cylinder,
   (3) means forming a part of said adapter and movable along said shaft for holding said elements in sealing relation.

10. The combination as recited in claim 9 in which,
   (1) said means forming a part of said adapter supports a shaft cleaner ring in assembled relation with said ring-shaped elements of said seal.

11. The combination as recited in claim 9 in which,
   (1) said means forming a part of said adapter supports a shaft cleaner ring in assembled relation with said ring-shaped elements of said seal, and
   (2) a ring of compressible material disposed between said cleaner ring and said means provides a flexible mounting of said cleaner ring with respect to said housing.

References Cited in the file of this patent

UNITED STATES PATENTS

| | | |
|---|---|---|
| 884,864 | Salt et al. | Apr. 14, 1908 |
| 3,011,845 | Watt et al. | Dec. 5, 1961 |
| 3,062,555 | Britton | Nov. 6, 1962 |
| 3,084,945 | Alexander | Apr. 9, 1963 |

FOREIGN PATENTS

| | | |
|---|---|---|
| 1,179,344 | France | Dec. 22, 1958 |